Patented Feb. 17, 1953

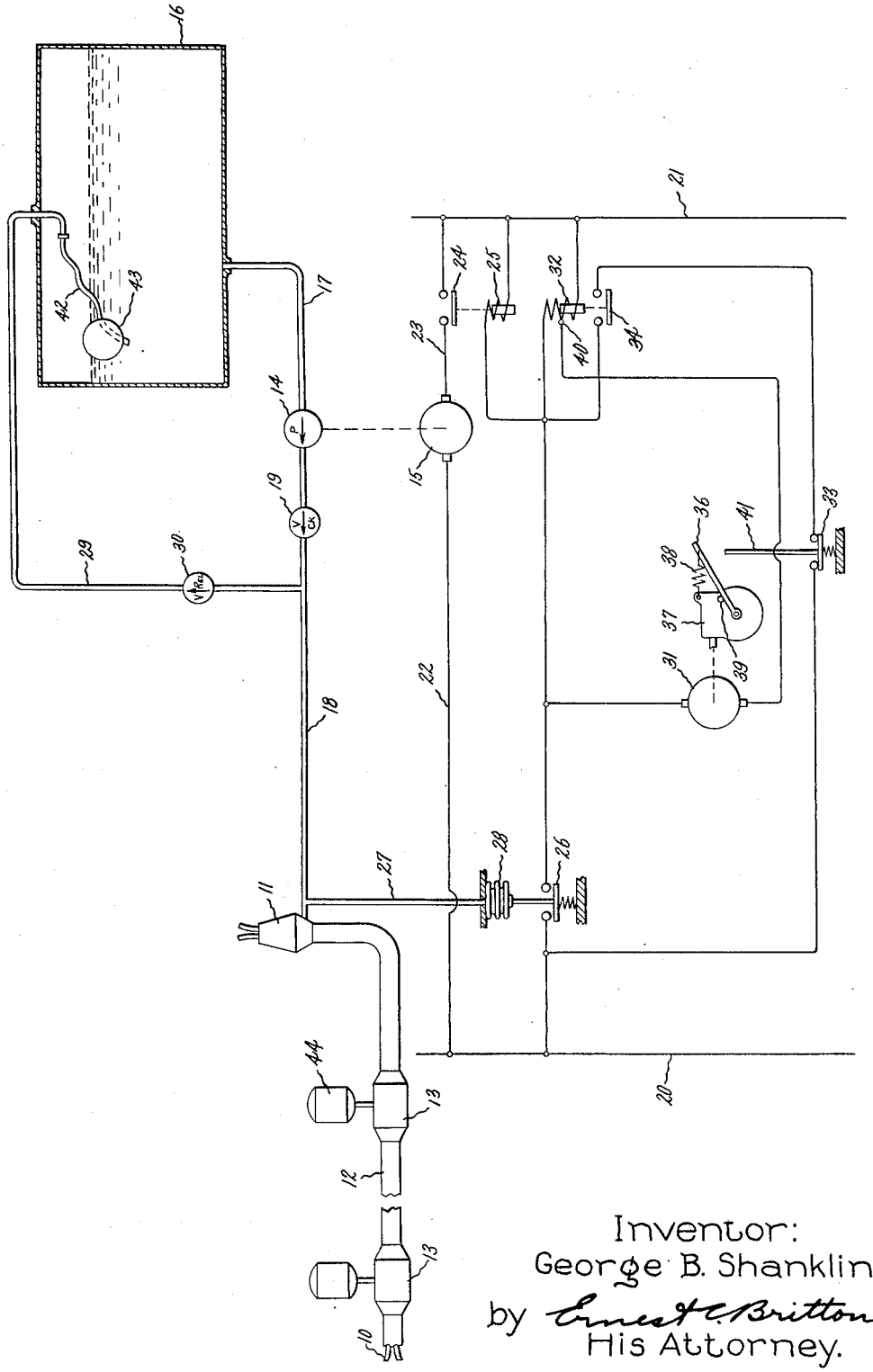
Inventor:
George B. Shanklin,
by Ernest C. Britton
His Attorney.

2,628,995

UNITED STATES PATENT OFFICE 2,628,995

TIME DELAY MEANS FOR CONTROLLING FLUID PRESSURE IN ELECTRIC CABLE SYSTEMS

George B. Shanklin, Schenectady, N. Y., assignor to General Electric Company, a corporation of New York Application October 30, 1948, Serial No. 57,575

7 Claims. (Cl. 174—11)

The present invention relates to fluid filled cable systems and more particularly to an improved means for maintaining and controlling fluid pressures in high pressure oil-filled cable systems.

As is well known, the maintaining of any desired pressure within certain limits in such a system is very important and of great advantage in insuring reliable and continuous operation of the system. In an attempt to accomplish this objective, an automatic motor-driven pump unit has been employed to pump oil from a low pressure reservoir or supply tank into one end of the system when the pressure therein dropped to an undesirable lower limit. Due to the relatively high viscosity of the oil, especially in the winter season, the pump cannot force oil into the cable system at its constant rate of delivery without a relatively rapid rise in pressure at the pump end of the line long before the required amount of oil has reached the far end. When the pressure at the pump end reaches the maximum desired pressure the pump is automatically shut off by a pressure control switch and as a matter of actual experience it has been found that under extreme conditions this maximum pressure has been reached before the pump has actually attained full speed. As a result, only a negligibly small part of the oil required by the system has actually been supplied to it before the pump is stopped. Since cooling of the system still continues, the drop in pressure is quite rapid and the minimum pressure limit is quickly reached. The pump quickly starts up again and repeats such racing cycles. It has actually been found that under some conditions these cycles are repeated about every minute, the pump operating for about four seconds to raise the pressure and the pressure thereafter dropping to the minimum limit during the remaining part of the cycle. Obviously, this is a very undesirable method of operation. Such rapid cycling not only wears out all parts of the pump system but it fails to maintain a safe pressure at the far end of the cable line because a sufficient amount of oil for this purpose is never injected into the system.

Theoretically, a gas cushioned high pressure storage tank as an auxiliary to the pump might be employed for overcoming these difficulties. However, it is not economical to incorporate an auxiliary pressure tank of this kind since such a tank would of necessity be too large and expensive. Depending upon length, a pipe cable system of this kind might have a total oil capacity of from a few thousand gallons to as much as 50,000 gallons or even more. Both cyclic heating and seasonal temperature changes involve a maximum temperature range in the order of 70° to 80° C. Since oil has a fairly high coefficient of expansion the total volumetric change for such a large amount of oil over this range of temperature would require tanks having a capacity of from 1000 to 5000 gallons of oil or more. It will therefore be apparent why a high pressure cushioned reservoir for taking up part or all of these volumetric changes would not be economical.

It is therefore an object of this invention to provide an improved means for maintaining the pressure throughout such an oil filled electric cable system within predetermined minimum and maximum limits.

It is a further object of this invention to provide means for maintaining the pressure in such a system within these limits without the need of expensive auxiliary cushion reservoirs.

It is still a further object of this invention to provide pumping means to control the pressure in a cable system within desired limits and to prevent the undesirable racing cycles currently associated with such pumping means.

In accordance with this invention, I provide a pressure responsive means operative in response to predetermined minimum and maximum pressures in a cable system to control the starting and stopping respectively of a feed means employed to feed fluid into the system and time delay means operative to render the pressure responsive means ineffective to stop the feed means upon the occurrence of the predetermined maximum pressure at the feed end of the line and until a predetermined period after the starting of the feed means, which predetermined period is considerably longer than the time ordinarily required for the feed means to reach the maximum pressure.

In addition, means is provided to prevent the feed means from increasing the pressure in the system above the predetermined value while feeding fluid thereto during the predetermined period.

The invention will be better understood from the following description when taken in connection with the accompanying drawing and the scope of the invention will be pointed out in the appended claims.

In the drawing, a relatively small portion of a cable system is illustrated in which one or more insulated but unsheathed cable conductors 10 terminating at a terminal 11 are enclosed in a steel pipe line 12. The line may have a length anywhere from 1000 ft. or less as employed for station connections to 15 miles or more as employed for power transmission and is filled with an insulating fluid such as oil which must be maintained under sufficiently high pressure to increase its dielectric strength. In lieu of the pipe line 12 the system may comprise, in so far as this invention is concerned, the so-called self-contained cable arrangement in which one or more separate oil channels are enclosed together with one or more insulated conductors within a reinforced lead sheath for containing the pressure. Joints 13 are provided at suitable intervals to connect corresponding ends of cable sections. To control the oil pressure in the pipe line within predetermined limits, a pump 14 driven by an electric motor 15 is employed to feed oil from a low pressure oil storage tank 16 through suction pipe 17 to one end of the cable system through a feeder and discharge pipe 18. A check valve 19 is positioned in the feeder line to prevent flow of fluid, under expansion conditions in the cable system, back through the pump to the storage tank. Pump motor 15 is energized from power leads 20 and 21, connected to a suitable source of low voltage supply current, through motor leads 22 and 23 the latter one of which has a motor control switch 24 therein operable by solenoid 25. The energization of solenoid 25 is controlled by pressure responsive switch 26 in the solenoid control circuit. Oil pipe or conduit 27 connects the pressure responsive element 28 with pump feed line 18 adjacent the end of the cable pipe line. Pressure responsive element 28 is adjustable to be responsive to various predetermined values of pressure in pipe line 12. For example, should the pressure therein fall to a value of 180 pounds per square inch, element 28 will be effective to close switch 26 whereby solenoid 25 is energized to close motor control switch 24 whereupon motor 15 is started and pump 14 will feed fluid into the cable system or pipe line 18. Thereafter the pressure in the system will rapidly rise, especially at the pump end thereof as previously pointed out, until it reaches a maximum value of, say 220 pounds per square inch, at which time pressure responsive element 28 will become effective to open switch 26. Motor control switch 24 will then open because of the resulting deenergization of solenoid 25 whereupon pump 14 will cease feeding oil into the system. Under very heavy load or high temperature conditions the resulting expansion of the oil in the line 12 might tend to greatly exceed the maximum value of 220 lbs. per square inch. To prevent the occurrence of such pressures an oil conduit or pipe line 29 is provided to connect the high pressure side of the pump on the downstream side of check valve 19 with the top of storage tank 16. A normally closed pressure release valve 30 set to open at a pressure slightly in excess of 220 lbs. per square inch is installed in line 29 so that when the pressure exceeds the setting of valve 30 it will open allowing the expanding oil to flow into storage reservoir 16 whereby the pressure in line 12 will remain at or below the maximum desired value.

With the exception of line 29 which has previously been connected with the pump suction line 17 instead of to the storage tank, and thus merely by-passed the pump, the pumping system thus far described is substantially in accordance with a well-known prior art arrangement and is characterized by possessing all the disadvantages of the rapid or racing feed cycles hereinbefore discussed. However, in accordance with this invention, pressure release valve 30 is given a dual function and means is provided to delay the discontinuance of oil feed to the cable system for a predetermined time after the pump is put in operation. This predetermined time is made considerably longer than the time normally required for the pump to reach the maximum pressure of 220 pounds per square inch and thereby the feeding of the oil into the cable system is normally continued for some time after the maximum pressure is reached. Although any other means, time delay or otherwise, which accomplishes the objective of this invention may be employed, I have illustrated a timing means comprising a timing or time delay motor 31, a switch control relay coil 32, both of which are in parallel circuit relation with a portion of the motor control circuit and a pair of switches 33 and 34 in shunt circuit relation with solenoid control switch 26. Switch 34 is a normally open switch operable to a closed position by relay coil 32, and switch 33 is normally closed. Timing motor 31 is a self excited synchronous type arranged to rotate switch operating arm 36 through a gear box 37 in a clockwise direction as viewed in the drawing against the tension of a restoring spring 38 which serves to turn the arm 36 counterclockwise to a position against a stop 39 at all times except when motor 31 is energized. Since the voltage usually available for the operation of pump motor 15 may exceed the relatively lower voltage at which conventional timing motors are designed to operate, one terminal of the timing motor circuit is connected to an intermediate point 40 of the relay coil winding 32 whereby power is furnished to timing motor 31 at the reduced voltage desired because of the increased resistance and inductance thereby introduced into the circuit.

It will be apparent that when solenoid control switch 26 and normally open switch 34 are in the open position illustrated, solenoid 25, relay 32 and timing motor 31, in series circuit relation therewith, will all be deenergized and pump 14 will be inoperative. When the cable line cools and the pressure at the pump end drops to 180 pounds per square inch, pressure responsive means 28 will become effective to close solenoid control switch 26 and energize solenoid 25 whereupon motor control switch 24 will be closed to start operation of pump 14 and feeding of fluid to the line 10. Simultaneously, relay 32 will be energized to close switch 34 whereby the shunt circuit around switch 26 is completed and timing motor 31 will also be energized by way of a circuit from line 20, through switch 26, motor 31, a portion of relay winding 32 to line 21 to start rotation of switch operating arm 36 against the biasing action of spring 38. The relative speeds of rotation of switch operating arm 36 and timing motor 31 may be made variable by any suitable and obvious means within the casing 37. In any event, these speeds are so set that arm 36 engages the switch projecting arm 41 with which it is aligned only after the lapse of a predetermined period which is considerably longer than the period normally required for the pump to reach the maximum pressure of 220 pounds per square inch. Although the pressure responsive element 28 will become effective to open switch 26 when this maximum value is reached, pump 14 will nevertheless continue to feed fluid into the system for this predetermined period by virtue of the shunt circuit around switch 26 previously completed by closing of switch 34 whereby solenoid 25 is continued energized to hold switch 24 closed. Since seldom, if ever, does the time required for the pump to reach maximum pressure vary to any great degree, this means that the maximum pressure is normally maintained on the cable system for substantially the same length of time whenever the pump is set in operation. This period of maximum pressure will be terminated upon the engagement of switch operating arm 36 with switch projection 41 whereupon normally closed switch 33 will be opened whereby timing motor 31 will become deenergized and the shunt circuit around switch 26 will be broken upon the resulting deenergization of relay coil 32. Since solenoid 25 will also become deenergized thereby, switch 24 will drop open and the pump 14 will cease to feed fluid to the cable system. Upon deenergization of timing motor 31, spring 38 will return arm 36 to its illustrated position against stop 39, thus permitting switch 33 to reclose.

In addition to the function previously pointed out, pressure relief valve 30 which has been set to open at a pressure slightly in excess of 220 lbs. per square inch serves to limit any increase of pressure in the pipe line to approximately 220 lbs. per square inch whenever the pump continues to operate for a considerable period after the pressure at the feed end of the system has reached this value; which, of course, the pump normally does because of the delaying action of the timing means. Inasmuch as the output capacity of pump 14 is determined by the maximum oil demand of the entire cable system and since only a fraction of the total pump output is required by the system once the pressure at the feed end thereof reaches 220 lbs. per square inch, the surplus oil is by-passed to the storage reservoir during the predetermined period at the pressure setting of relief valve 30. This means that a very appreciable part of the pump output is by-passed in this way under usual conditions. If line 29 were connected to the pump suction 17 instead of to the top of the storage tank as illustrated, it will be apparent that a limited volume of oil would be by-passed which obviously would result in excessive heating and wearing out of the oil due to friction. This is avoided in the arrangement shown since the whole volume of oil in the storage tank is circulated during this period of by-passing. The surplus oil may be sprayed or splashed into the top of the tank. However, such splashing may be avoided by the use of a flexible hose 42 and a float 43 as illustrated.

Thus, although the oil in the cable system continues to cool and contract after the feed pump 14 stops, a much longer time than formerly elapses before the minimum pressure of 180 lbs. per square inch is reached at the pump end because of the much greater quantity of oil injected into the cable system during the time delay action. This serves to increase the time cycles of the pump operation to almost any extent desired, depending upon the timing adjustment between the timing motor 31 and the switch actuating arm 36. Actual experience in the field has shown that this continued method of pump operation has completely solved the problem of racing cycles without the need of expensive auxiliary cushion reservoirs. To further improve uniform pressure control along the full length of the cable system, small, relatively inexpensive cushion reservoirs 44 may be employed as an auxiliary to the time delay pumping system at several points in the line such as at the joints 13 as illustrated.

While I have, in accordance with the patent statutes, shown and described a particular embodiment of my invention, changes and modifications therein will be obvious to those skilled in the art and I, therefore, aim in the appended claims to cover such modifications as fall within the true spirit and scope of my invention.

What I claim as new and desire to secure by Letters Patent of the United States is:

1. In a fluid-filled cable system containing a fluid subject to changes in volume due to temperature variations therein, the combination of a fluid storage tank, a pump to feed fluid from said storage tank to one end of said system, pump control means operable in response to and upon the occurrence of a predetermined minimum pressure in said system for starting said pump, whereby the pressure in said system is raised to a predetermined maximum value, and rotatable adjustable timing means operable to cause continued operation of said pump for a predetermined period after the starting thereof, said period being longer than the time normally required for said pump to attain said maximum pressure.

2. In an electric cable system comprising insulated cable conductors enclosed in a pressure containing conduit filled with a liquid subject to changes in volume due to temperature changes therein, the combination of a fluid storage tank, a pump to feed fluid from said storage tank to said conduit whereby the pressure therein is increased, pressure actuated pump control means responsive to a predetermined minimum pressure in said conduit to start said pump upon the occurrence of said minimum pressure, means including rotatable adjustable timing means operative to render said pump control means ineffective to stop said pump for a predetermined period after the starting thereof, said period being longer than the time normally necessary for the pump to reach maximum pressure.

3. In a fluid-filled electric cable system containing a fluid subject to changes in volume due to temperature changes therein, the combination of a fluid storage tank, a pump to feed fluid from said storage tank into said system, pump control means operable in response to and upon the occurrence of a predetermined minimum pressure in said system to start said pump in operation, rotatable adjustable timing means operable to maintain said pump in operation for a predetermined period after the starting thereof, said period being longer than the time normally required for said pump to reach a predetermined maximum pressure, a fluid conduit connecting the discharge side of said pump to said storage tank, and a normally closed pressure relief valve in said fluid conduit operable to an open position upon the occurrence of said predetermined maximum pressure at said valve to render said pump ineffective to raise the pressure in said system above said maximum pressure during said predetermined period.

4. In a fluid filled electric cable system containing a fluid subject to changes in volume due to temperature changes therein, a fluid storage tank, a fluid circulating pump, the intake side of said pump being connected to said storage tank and the discharge side being connected to one end of said system, rotatably operable and adjustable timing means, pressure control means operable in response to and upon the occurrence of a predetermined minimum pressure in said system to cause operation of said pump and initiate operation of said timing means whereby said pressure control means is rendered ineffective to control the operation of said pump upon the occurrence of a predetermined maximum pressure in said system and said timing means is rendered effective to cause continued operation of said pump for a predetermined period after the starting thereof.

5. In an electric cable system, a pipe line containing a fluid subject to changes in volume due to temperature changes therein, a fluid storage tank, a fluid circulating pump, the intake side of said pump being connected to said storage tank and the discharge side being connected to one end of said pipe line, a fluid conduit connecting the discharge side of said pump with the top of said storage tank, a normally closed pressure relief valve in said fluid conduit, rotatably operable and adjustable timing means, pressure control means operable in response to and upon the occurrence of a predetermined minimum pressure in said pipe line to cause operation of said pump and initiate operation of said timing means whereby said pressure control means is rendered ineffective to control the operation of said pump upon the occurrence of a predetermined maximum pressure in said pipe line and said timing means is rendered effective to cause continued operation of said pump for a predetermined period after the starting thereof, said pressure relief valve being operable to an open position upon the occurrence of a pressure at said valve slightly in excess of said maximum pressure to render said pump ineffective to raise the pressure in said pipe line above said maximum pressure during said predetermined period.

6. In an electric cable system comprising insulating unsheathed cable conductors enclosed in a pipe line filled with a fluid subject to change in volume due to temperature variations therein, the combination of a fluid storage tank, a pump to feed fluid from said storage tank to one end of said pipe line whereby the pressure therein is increased, pressure actuated control means responsive to a predetermined minimum pressure in said pipe line for starting said pump upon the occurrence of said minimum pressure, and means including rotatable adjustable timing means operative to cause continued operation of said pump for a predetermined period after the starting thereof, said period being longer than the time normally necessary for said pump to cause a predetermined maximum pressure in said pipe line.

7. In an electric cable system comprising insulated unsheathed cable conductors enclosed in a pipe line filled with a fluid subject to changes in volume due to temperature changes therein, the combination of a fluid supply tank, a pump to feed fluid from said supply tank to one end of said pipe line, an electric driving motor connected to said pump, a motor control switch in a power lead connected to said motor, a motor control circuit, a solenoid in said motor control circuit operative when energized to close said motor control switch, a relay coil in parallel circuit relation with a portion of said motor control circuit, a timing motor in parallel circuit relation with a portion of said motor control circuit, a solenoid control switch in said motor control circuit in series circuit relation with said relay coil circuit and said timing motor circuit, a normally closed switch in shunt circuit relation with said solenoid control switch, a normally open switch in said shunt circuit in series with said normally closed switch and operative to a closed position upon energization of said relay coil, said solenoid control switch in said motor control circuit being operative to an open position in response to a predetermined maximum pressure in said pipe line and operative to a closed position in response to a predetermined minimum pressure in said pipe line to cause operation of said pump motor and said timing motor and closing of said normally open switch in said shunt circuit whereby the pressure in said system is raised to said predetermined maximum value, the closed position of said normally open switch being effective to cause continued operation of said pump motor after the occurrence of said maximum pressure, said timing motor being operative at the termination of a predetermined period to open said normally closed switch whereby said pump motor is rendered inoperative, a fluid conduit connecting the discharge side of said pump with the top of said fluid supply tank, and a normally closed pressure relief valve in said fluid conduit operative to an open position upon the occurrence of a pressure slightly in excess of said maximum pressure to render said pump ineffective to raise the pressure in said pipe line above said maximum pressure during said predetermined period.

GEORGE B. SHANKLIN.

REFERENCES CITED

The following references are of record in the file of this patent:

UNITED STATES PATENTS

| Number | Name | Date |
|---|---|---|
| 1,973,068 | Held | Sept. 11, 1934 |
| 1,991,368 | Bennett | Feb. 19, 1935 |
| 2,011,389 | Zapf | Aug. 13, 1935 |
| 2,030,943 | Schrottke | Feb. 18, 1936 |
| 2,186,444 | Bennett | Jan. 9, 1940 |
| 2,237,803 | Zysk | Apr. 8, 1941 |
| 2,388,666 | Bower | Nov. 13, 1945 |